United States Patent
Robinson et al.

(10) Patent No.: US 6,263,433 B1
(45) Date of Patent: *Jul. 17, 2001

(54) PROVISION OF CONTINUOUS DATABASE SERVICE AND SCALABLE QUERY PERFORMANCE USING ACTIVE REDUNDANT COPIES

(75) Inventors: Irving M. Robinson, San Diego; Selim Zoher Antoun, Del Mar, both of CA (US); Patric B. Dempster, Atlantic Highlands, NJ (US); Robert J. MacDonald, San Diego; Richard G. Stellwagen, Jr., Poway, both of CA (US); Terence J. Blevins, Springboro, OH (US); David Allen Ramsey, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/163,708

(22) Filed: Sep. 30, 1998

(51) Int. Cl.[7] ........................................ G06F 9/445
(52) U.S. Cl. .......................... 713/100; 709/223; 714/4; 714/7
(58) Field of Search .......................... 713/1, 2, 100; 707/100, 101, 102, 103, 104, 200–206, 3; 709/227, 220–222, 223; 714/4, 5, 6, 7, 11; 395/112.04; 712/13

(56) References Cited

U.S. PATENT DOCUMENTS

| | | |
|---|---|---|
| 4,432,057 | 2/1984 | Daniell et al. . |
| 5,023,873 | 6/1991 | Stevenson et al. . |
| 5,210,854 | 5/1993 | Beaverton et al. . |
| 5,359,730 | 10/1994 | Marron . |
| 5,410,684 | 4/1995 | Ainsworth et al. . |
| 5,414,837 | 5/1995 | Kotatsu . |

(List continued on next page.)

OTHER PUBLICATIONS

Wesley W. Chu and Ion Tim Ieong, A Transaction–Based Approach to Vertical Partitioning for Relational Database Systems, *IEEE Transactions on Software Engineering*, vol. 19, No. 8, Aug. 1993, pp. 804–812.

Primary Examiner—Thomas Lee
Assistant Examiner—Rijue Mai
(74) Attorney, Agent, or Firm—Gates & Cooper; John D. Cowart (57) ABSTRACT

A method and apparatus for distributing computer resources in a network environment. A network of computer systems is partitioned into at least one computing system partition, and is configured into at least one redundancy group. The computing system partitions include applications, computing system nodes, and copies of a database schema. The copies of the database schema are replicated at each computing system partition within a network. The computing system partition manages interactions between the instances, the computing system nodes, and the copy of the database schema within the respective computing system partition. The redundancy group comprises at least one computing system and at a plurality of computing system partitions, and manages the replication of the database schema within the computing system and computing system partitions.

18 Claims, 6 Drawing Sheets

U.S. PATENT DOCUMENTS

| | | |
|---|---|---|
| 5,448,727 | 9/1995 | Annevelink . |
| 5,613,060 | 3/1997 | Britton et al. . |
| 5,678,042 * | 10/1997 | Pisello et al. ................ 395/610 |
| 5,745,753 * | 4/1998 | Mosher, Jr. ................... 707/202 |
| 5,758,052 | 5/1998 | Glowny et al. . |
| 5,784,560 * | 7/1998 | Kingdon et al. ............... 709/201 |
| 5,790,674 | 8/1998 | Houvener et al. . |
| 5,815,649 * | 9/1998 | Utter et al. ................ 395/112.04 |
| 5,832,225 | 11/1998 | Hacherl et al. . |
| 5,845,255 * | 12/1998 | Mayaud ............................ 705/3 |
| 5,896,370 | 4/1999 | Eckhoff et al. . |
| 5,905,860 | 5/1999 | Olsen et al. . |
| 5,909,540 * | 6/1999 | Carter et al. ..................... 714/4 |
| 5,960,426 * | 9/1999 | Pirahesh et al. ................... 707/3 |
| 5,987,516 * | 11/1999 | Rao et al. ....................... 709/227 |
| 5,995,980 * | 11/1999 | Olson et al. .................... 707/201 |
| 6,052,724 * | 4/2000 | Willie et al. .................. 709/223 |

\* cited by examiner

PROVISION OF CONTINUOUS DATABASE SERVICE AND SCALABLE QUERY PERFORMANCE USING ACTIVE REDUNDANT COPIES

CROSS REFERENCE TO RELATED APPLICATIONS

This application is related to co-pending and commonly assigned U.S. patent application Ser. No. 09/164,258, filed on same date herewith, by Lynn Poul Hedegard, entitled "Automated Application Fail-Over For Coordinating Applications With DBMS Availability," which application is incorporated by reference herein.

BACKGROUND OF THE INVENTION

1. Field of the Invention

The invention relates in general to computer systems, and more particularly, to a provision for continuous database service using active redundant copies of the database.

2. Description of Related Art

Many modern computer systems are in nearly continuous use, and have very little time to be taken "down" or "offline" for database updates or preventative maintenance. Further, computer systems increasingly require systems that virtually never fail and have little or no scheduled downtime. As a concurrent requirement, these same systems demand cost-effective computing solutions, open systems to avoid or reduce specific supplier dependencies, and the ability to leverage the latest hardware and software technologies as they become available.

Modern computer systems also have transitioned from a static installation to a dynamic system that regularly changes. The system continually contains new collections of products that are processing requests from a constantly changing user base. The ability of computing solutions to provide service availability in a dynamic environment is becoming increasingly important, because the pace of change in products and customers' environments is expected to increase. The term "change tolerance" has been used to describe the ability of a computer system to adapt to the dynamic environment required.

It can be seen, then, that there is a need in the art for a system that provides a high confidence level for continuous processing. It can also be seen, then, that there is a need in the art for a system with a high change tolerance. It can also be seen, then, that there is a need in the art for a system with reasonable development costs and implementation schedules that does not sacrifice the benefits of open systems.

SUMMARY OF THE INVENTION

To overcome the limitations in the prior art described above, and to overcome other limitations that will become apparent upon reading and understanding the present specification, the present invention discloses a method and apparatus for distributing computer resources in a network environment. A system in accordance with the present invention comprises at least one computing system partition, a plurality of computing systems, and at least one redundancy group. The computing system partitions include at least one instance of an application, at least one computing system node, and at least one copy of a database schema. The copies of the database schema are replicated at each computing system partition within a network. The computing system partition manages interactions between the instances, the computing system nodes, and the copy of the database schema within the respective computing system partition.

The computing systems are connected together via the network, and comprise one or more computing system partitions. The redundancy group comprises at least one computing system and at a plurality of computing system partitions, and manages the replication of the database schema within the computing system and computing system partitions.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a method, apparatus, and article of manufacture for distributing computer resources in a network environment.

At least one redundancy group and at least one computing system partition within the redundancy group are defined. The redundancy group comprises selected computer resources within the network environment. The selected computer resources include at least one application, at least one computer node, and at least one copy of a database. The computing system partitions comprise a subset of the selected computer resources within the network environment. The subset of the selected computer resources including at least one application, at least one computing node, and using only one copy of the database within the network environment. Tasks are performed within the network using the first computing system partition to perform the task.

Control for the detection of reassigning the recipient of the updates can occur upon hardware or software problems with the first assignee, or to allow the first assignee to be taken out of service for maintenance purposes. This control is provided by a combination of software systems operating on each of the networked computer systems, and can also be provided on external computers called Control Computers. The software on the networked computer and control computer together determine the status of each of the networked computers to determine when to reassign the recipient computer, and if so, which of the networked computers should receive the database updates. The determination is achieved by using periodic messages, time-out values, and retry counts between the software on the networked computers and the control computers.

Hardware Environment

Figure 1:
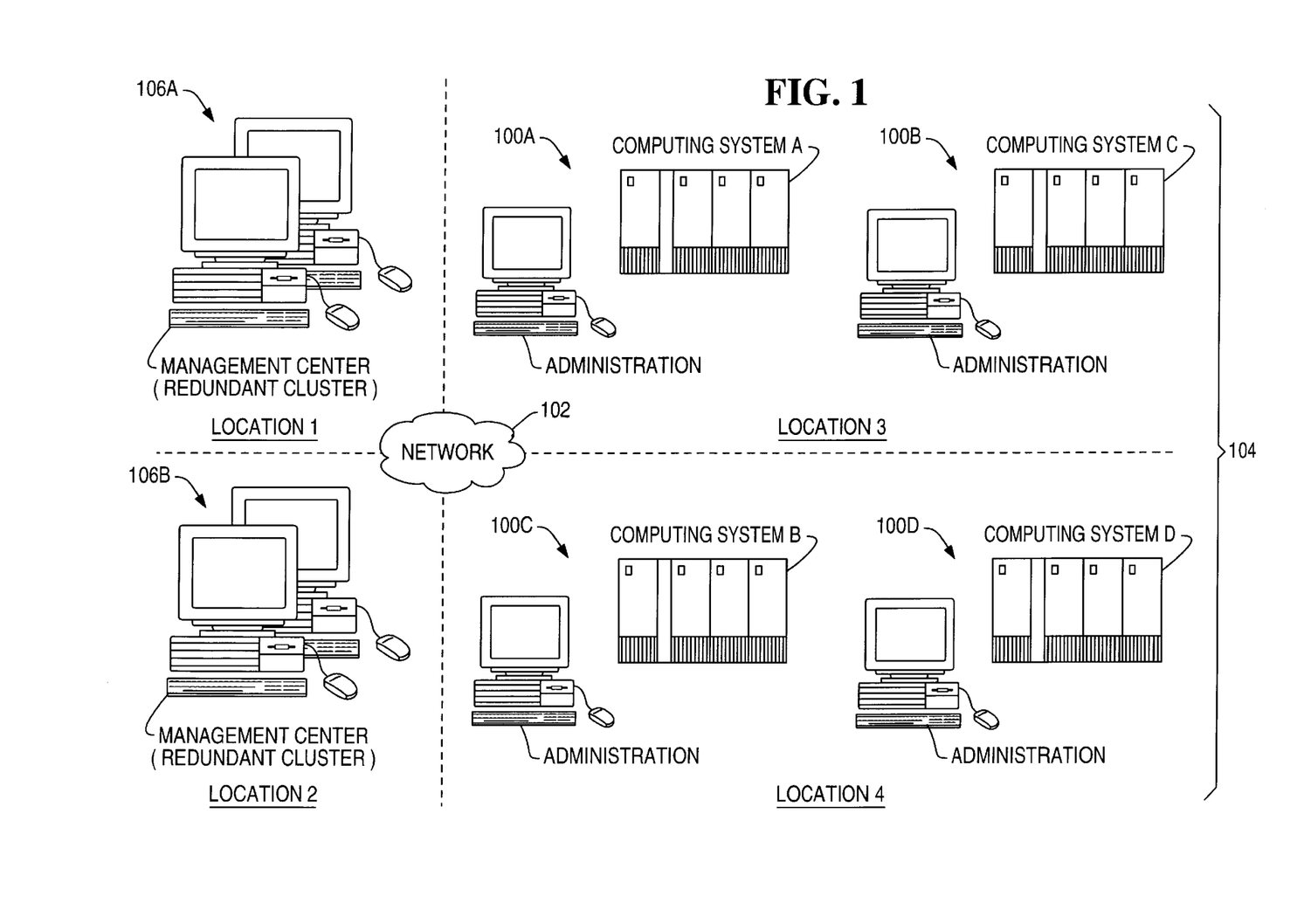
FIG. 1 is a block diagram that illustrates an exemplary hardware environment that could be used with the present invention.

FIG. 1 is an exemplary hardware environment used to implement the preferred embodiment of the invention. The present invention is typically implemented using a plurality of computing systems 100A–100D, each of which generally includes, inter alia, a processor, random access memory (RAM), data storage devices (e.g., hard, floppy, and/or CD-ROM disk drives, etc.), data communications devices (e.g., modems, network interfaces, etc.), monitor (e.g., CRT, LCD display, holographic display device, etc.), etc.

The computing systems 100A–100D are coupled together via network 102 and comprise a redundancy group 104. Each computing system 100A–D further comprises one or more computing system partitions, which are described in further detail in FIGS. 2–4. In addition, management centers 106A and 106B can be coupled to network 102. Management centers 106A and 106B are representative only; there can be a greater or lesser number of management centers 106 in the network 102. Further, there can be a greater or lesser number of computing systems 100A–100D connected to the network 102, as well as a greater or lesser number of computing systems 100A–D within the redundancy group 104.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Relationships and Operation

Figure 2:
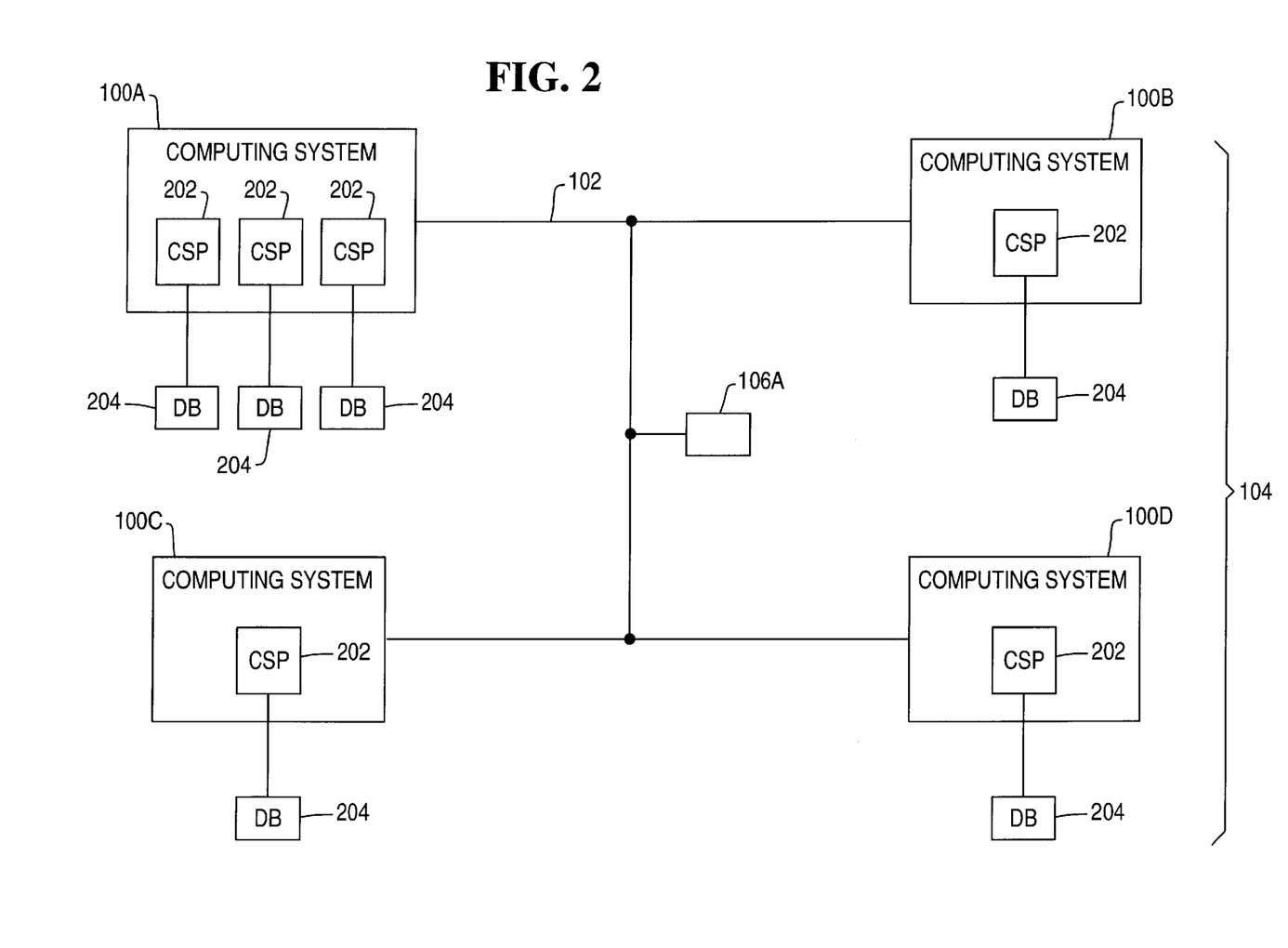
FIG. 2 illustrates the computing system partition of the present invention.

FIG. 2 further illustrates the components within a computing system of the present invention. Within the computing systems 100A–D are one or more computing system partitions (CSPs) 202. Each CSP 202 is coupled to only one copy of a database 204. The computing systems 100A–D are coupled together via network 102.

Management center computer 106A (or, alternatively, 106B) can be used to control the flow of data from the database copies 204 and updates to the computer systems 100A–100D. The database 204 can also be controlled directly from computer systems 100A–D if desired.

Each copy of the database 204 is associated with a computing system partition CSP) 202. As shown in FIG. 2, each computer system 100A–D can have one or more CSP's 202 resident within a computer system, as illustrated in computer system 100A.

A redundancy group 104 is a collection of Computing System Partitions 202 (CSPs) collaborating in an actively redundant fashion on a specific workload using a single replicated database 204 schema. The CSPs 202 may be resident on a single node computer system 100, a multi-node computer system 100, or on selected subsets of computing nodes from one or more multi-node computer systems 100. Each CSP 202 has an independent database copy of the database 204 for the redundancy group 104. The definition for a CSP 202 is that set of computing resources using a single copy of the replicated database 204.

The fundamental component of a CSP 202 is a single computing node executing an independent copy of an operating system. However, CSP 202 may consist of multiple nodes and, therefore, multiple operating system instances. The operating system operating on each CSP 202 can be different, e.g., one CSP 202 may be using Windows, while another CSP 202 uses Unix, etc. An operating system instance may be a participant in one and only one redundancy group 104, meaning that the computing nodes comprising a CSP 202 are "owned" by that redundancy group 104. A multi-node system can have different nodes participating in different redundancy groups 104, but there must be no overlap between redundancy groups 104.

To synchronize and replicate the database 204 between the computer systems 100A–100D, one of the computer systems 100A–D is responsible for receiving direct updates of the database 204 via network 102 and disseminating or replicating those updates of database 204 to the remaining computing systems 100.

As an example, computer system 100B can be designated as the recipient of the direct updates to database 204. Once the updates are received by computer system 100B, computer system 100B then sends a copy of the database 204 with updates to computer systems 100A, 100C, and 100D via network 102. This process continues until computer system 100B has sent a copy of database with updates to all computer systems within the network 102.

If computer system 100B is unavailable, the responsibility of replicating the database and updates shifts to another computer in the network 102. As an example, if computer system 100B is unavailable, the database replication responsibility shifts to computer system 100C, which then receives direct updates. Computer system 100C then replicates the database and updates to computer systems 100A and 100D. Computer system 100C continues the replication until all computers in the network 102 receive copies of the database and updates.

Redundancy Strategy

Figure 3:
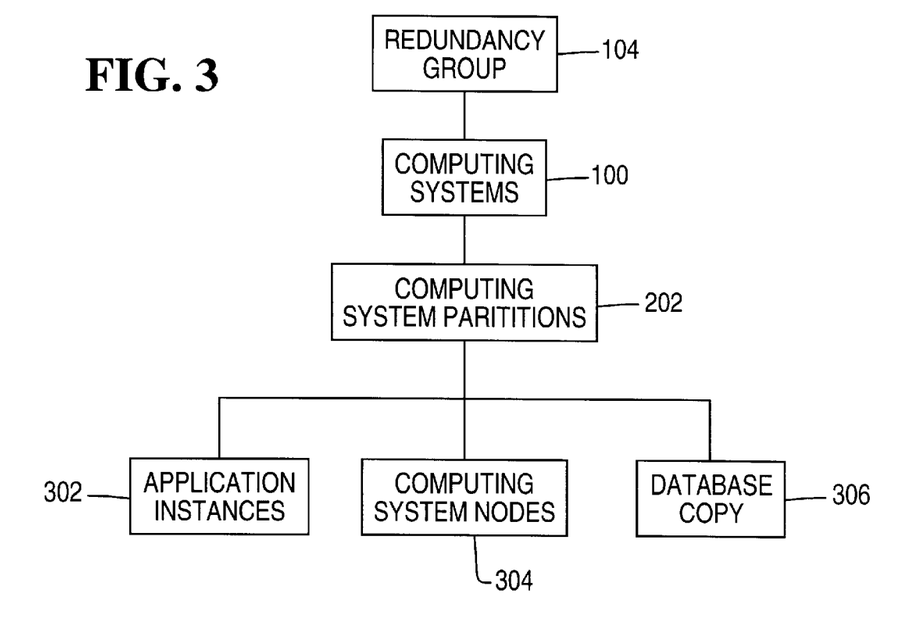
FIG. 3 illustrates the redundancy strategy of the present invention.

FIG. 3 illustrates the hierarchical redundancy strategy of the present invention. To effectively perform the replication of the database 204 and the updates as described in FIG. 2, the present invention partitions the network 102 into redundancy groups 104. Each redundancy group 104 is comprised of computing systems 100, computing system partitions 202, application instances 302, computing system nodes 304, and database copy 306. Database copy 306 is comprised of database 204 and updates.

Typical networks 102 have multiple redundancy groups 104. The relationship between redundancy groups 104 is somewhat limited, but all redundancy groups 104 can participate in a global network 102, and a global administration view is typically used for such a network 102. In general, however, redundancy groups 104 are envisioned to be mostly independent of each other and constructed for the purposes of application-level independence, administrative flexibility, or the ability to use computing systems 100 of modest capabilities.

The redundancy group 104 is the fundamental factor of service availability and scalable query performance. The present invention uses the redundancy group 104 to reduce or eliminate a server service outage so long as at least one CSP 202 in the redundancy group 104 is fully operational. The present invention also uses the redundancy group 104 to scale query performance beyond that attainable with just one computing system partition 104 and one copy of the database 306. Query performance and availability scale as CSP's 202 are added to a redundancy group. With standard computers, as performance goes up, availability typically goes down. The present invention allows both availability and query performance for data warehousing systems to both go up simultaneously.

Redundancy groups 104 of the present invention accommodate the condition in which CSPs 202 arbitrarily undergo exit and reintroduction scenarios, but a sufficiently configured redundancy group 104 does not cease proper functionality. The limits of redundancy group functionality and database 204 access is limited by scenarios outside of the control of the computer system, e.g., unplanned hardware or software malfunctions, etc.

Computer Architecture Model

Figure 4:
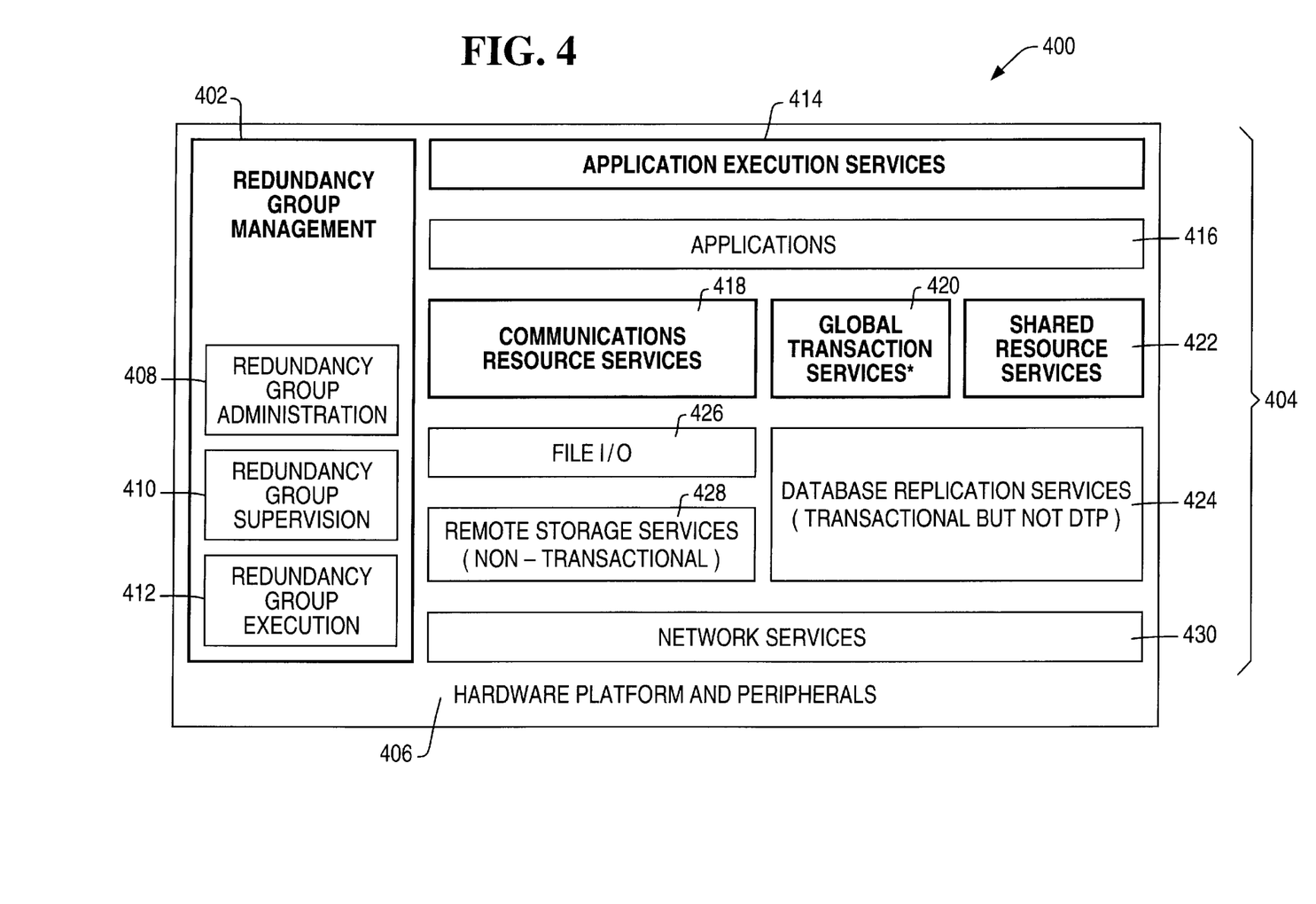
FIG. 4 illustrates a model of the computer architecture of the present invention.

FIG. 4 illustrates a model of the computer architecture of a computing system partition of the present invention. The architecture model 400 has three significant environments: the management environment 402, the run-time environment 404, and the hardware environment 406. The management environment 402 is illustrated as redundancy group management. The run-time environment 404 comprises the software components that provide application services directly or indirectly, which is the majority of the components in the model 400. The hardware environment 406 is depicted as the hardware platform, e.g., computer network 102, and peripherals.

Redundancy group management 402 comprises of the tools, utilities and services necessary to administer, supervise and provide executive control over elements of a redundancy group 104. The components within the redundancy group management 402 environment include redundancy group administration 408, redundancy group supervision 410, redundancy group execution 412.

The redundancy group administration 408 component provides tools for definition, configuration, and operations of a redundancy group 104. These tools communicate with other tools that provide administrative control of product specific components. Operations include facilities to startup, shutdown, install, and/or upgrade elements of redundancy groups 104. Included in the upgrade and install categories are special facilities necessary for verification. Included in the definition and configuration capabilities are defining policies and procedures to be used by both humans and machines. Additionally, it is foreseen that advanced utilities to determine the scope of failures and subsequently identify recovery procedures would be in this component. The tools of this environment are expected to execute in a management center facility.

The redundancy group supervision 410 component provides those services that monitor the health of a redundancy group 104. Included are the services for status request handling, heartbeat setup and monitoring, and failure detection.

The redundancy group execution 412 component provides those executive services that manage and control the work load of a redundancy group. Included are those services that provide transaction and request-level load balancing and reconfiguration. This component manages and controls the workload of normal transactions as well as recovery requests.

Run-time Environment

The run-time environment 404 comprises the services necessary to support application programs within redundancy groups 104. The components of the run-time environment 404 include application execution services 414, applications 416, communications resource services 418, global transaction services 420, shared resource services 422, database replication services 424, file i/o 426, remote storage services 428, and network services 430. These components fall into two categories, 1) those components typically utilized by applications directly, and 2) those components typically utilized by applications indirectly. Services that fall into the second category are used by those services in the first category.

Application execution services 414 provide pre- and post-processing on behalf of an application 416. Such services include application instantiation, parameter marshaling, and queue access services. Application execution services 414 also inform the application 416 of the status of a given transaction request and its disposition; for example, whether it is a normal transaction request, a recovery request, or whether the request is a request to startup or shutdown the application. Application execution services 414 also include services necessary to communicate to redundancy group management 402 components. Additionally, application execution services 414 handle application 416 error situations.

Applications 416 are services to the consumers of a system (network 102), and are composed of software components. Applications 416 are reduced in complexity by leveraging other services in a rich operating environment, such as application 416 execution services 414 and shared resource services 422, since these other services supply needed levels of transparency.

The communication resource services 418 component comprises services that provide application 416-to-application 416 communications within redundancy groups.

The global transaction services 420 component provides services to maintain transaction context and to coordinate transaction integrity procedures and protocols. These services include facilities for an application 416 to query the global transaction status, and commit or abort transactions.

The shared resource services 422 component is a general container for services that provide access to shared resources. In a redundancy group 104 the shared resources of interest are replicated databases 204, and, therefore, database 204 access services reside in the shared resource services 422 component. Database 204 access services include services that provide the capability to create, read, write, rewrite, and delete data within a replicated database.

Database replication services 424 fall into the indirect class of application 416 services. The database replication services 424 propagate database updates transparently to all copies of the database 204 in a redundancy group 104. There are primarily two database 204 replication models, as described in the discussion relating to FIG. 5.

File i/o services 426 are not utilized directly by customer applications 416, but are provided for use by system software components requiring non-transactional, persistent data storage and access services. File i/o is typically used for logging or journaling functions, event capture, software executables, and data interchange files.

Remote storage services 428 allow a given file update request to be processed at locations remote from the location of the file i/o request, enabling file replication. System components that take advantage of these services are those that require non-transactional access to queues, logs and system files that would be inappropriate for storage in an database.

Network services 430 include those services that provide high performance, highly reliable transport of messages. Of specific interest are those services that provide multi-casting of messages which results in an optimal and guaranteed delivery of messages to all destinations in a specified domain of receivers. This component also benefits applications indirectly, e.g., customer applications would not call the interface that initiates these services. Rather, these services would be provided to the application 416 through communications resource services 418.

Network platform 406 is the computing hardware, e.g., network 102, that is used for executing the instructions associated with the application 416, etc.

Database Replication Schemes

Figure 5:
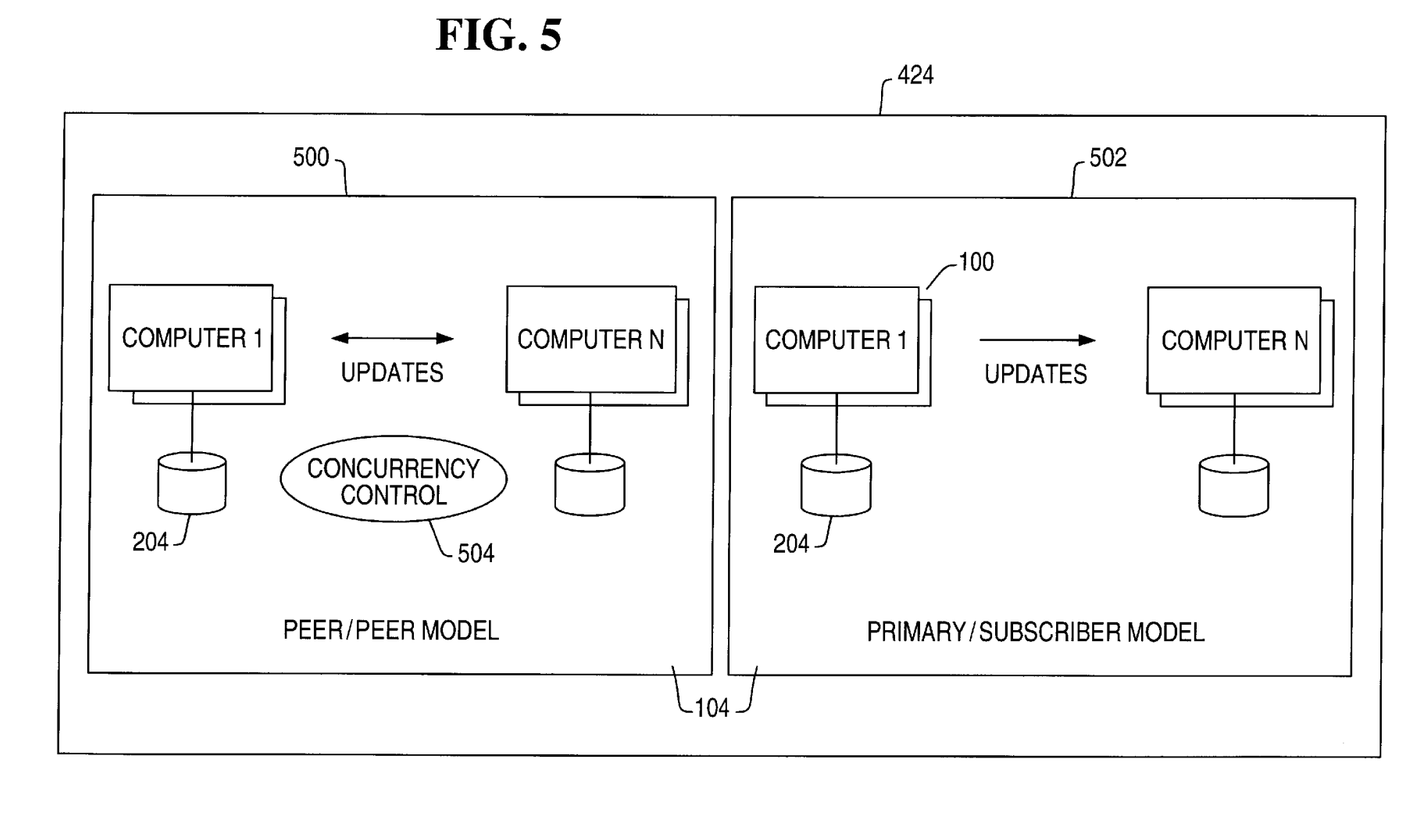
FIG. 5 illustrates replication of the database using the present invention.

FIG. 5 illustrates replication of the database using the present invention. Within network 424, replication schemes 500 and 502 can be utilized to replicate database 204. Either replication scheme 500 or replication scheme 502, or both, can be used within network 424, depending on the architecture of the redundancy groups 104.

Database 204 replication is the synchronization mechanism between the database 204 copies in a redundancy group 104. The present invention could also utilize transaction-level replication (reprocessing the entire application transaction on each participating system) instead of entire database 204 replication, but the discussion relating to database 204 replication applies equally well to transaction-level replication. References herein relating to database 204 replication include transaction-level replication.

At least two distinct database 204 replication models are supported by the present invention, peer/peer replication model 500 and primary/subscriber replication model 502. Other database replication models are envisioned, but the discussion herein is limited to the two models 500 and 502. The peer/peer replication model 502 update transactions are processed on any logical system in a redundancy group 104. Inter-copy database 204 consistency and serializability are maintained either through global network 102 concurrency controls 504, or through commit certifications that occur within the redundancy group 104.

In the primary/subscriber replication model 502, all update transactions are routed to a single logical system, e.g., computer system 100A–D, in the redundancy group 104, called the primary system, which propagates updates to the other logical systems, e.g., computer systems 100A–D, after the commitment of a transaction is complete. The update transaction routing is performed transparently and automatically. When the primary logical system, e.g., computer system 100A, exits the redundancy group 104 (for reasons of failure or scheduled downtime) a new primary system is selected. See the discussion relating to FIG. 2.

Figure 6:
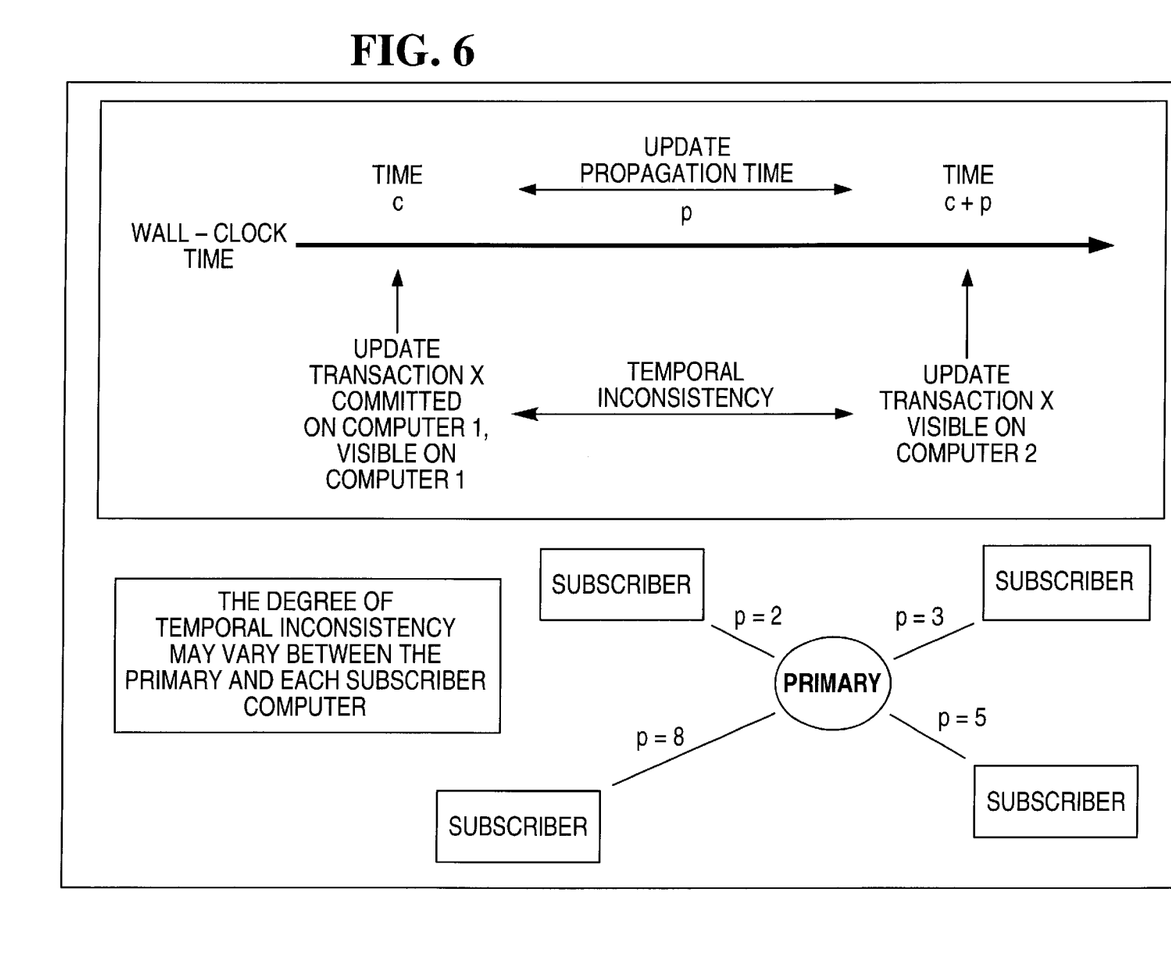
FIG. 6 illustrates temporal consistency of the database that is propagated by the present invention.

FIG. 6 illustrates temporal consistency of the database that is propagated by the present invention. Within either replication model 500 or 502, the database 204 will have temporal inconsistencies because time is required to update the database 204 on each of the network 102 computers within a redundancy group 104. Update propagation in replicated database 204 processing has a side effect in that a trade-off must be made between update efficiency and the temporal consistency of the database 204 copies in the redundancy group 104. It is possible to synchronize the database 204 copies by propagating updates before the completion of an update transaction, e.g., before releasing database 204 locks and allowing commit processing to complete. However, absolute synchronization requires propagation protocols that are complex and expensive from a computing perspective.

The present invention allows the database 204 copies to deviate from each other in a temporal sense, and restrict consistency constraints to serializability and transaction-level atomicity. The approach of the present invention prevents any copy of the database 204 from having "dirty data," "partial updates," or out-of-order updates, but the timing of the appearance of the updates from a given transaction in any particular database 204 copy will be delayed to an unpredictable degree. The temporal deviation between the database 204 copies will be dependent on numerous factors including hardware utilization, instantaneous transaction mix, and network 102 latency. The effects of inter-copy temporal inconsistency can be mitigated with numerous application processing techniques, including restriction of updates to selected time windows (during which queries may be restricted), clever partitioning of the query processing workload, and clever partitioning and/or clustering of user queries to specific database copies.

For a single replicated database schema, shown in replication model 502, each actively redundant configuration will support only one replicated database schema because of transaction-level consistency constraints.

Logic of the Database Replicator

Figure 7:
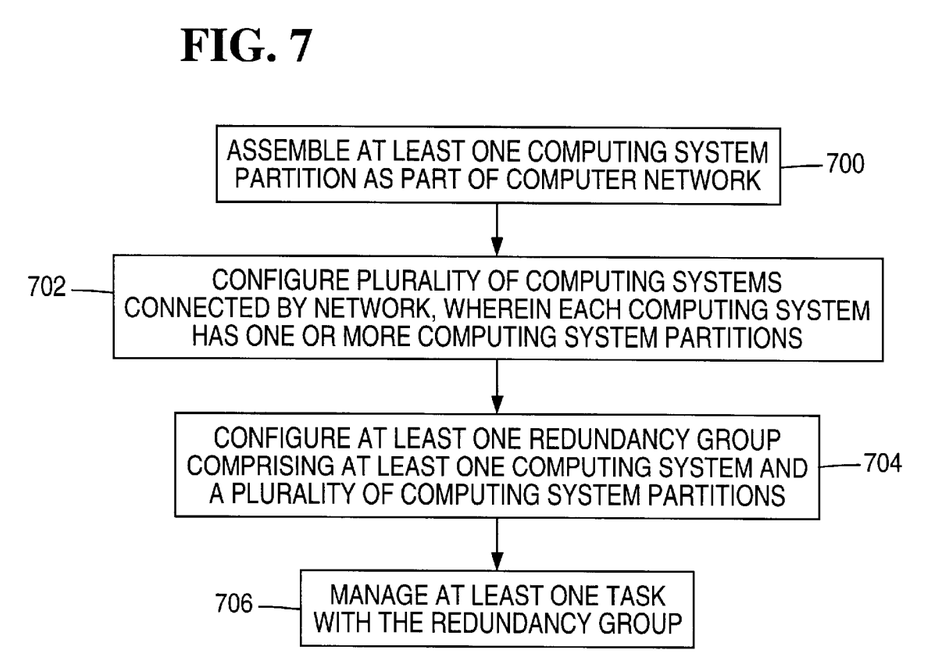
FIG. 7 is a flowchart that illustrates exemplary logic performed by the controller according to the present invention.

FIG. 7 is a flowchart that illustrates exemplary logic performed by the controller according to the present invention.

Block 700 represents the computer 100 assembling, as part of a computer network, at least one computing system partition, including at least one instance of an application, at least one computing system node, and at least one copy of a database schema, the copies of the database schema being replicated at each computing system partition within the computer network.

Block 702 represents the computer 100 configuring, within the computer network, a plurality of computing systems connected together via the computer network, wherein each computing system comprises one or more computing system partitions.

Block 704 represents the computer 100 configuring, within the computer network, at least one redundancy group, comprising at least one computing system and at a plurality of computing system partitions.

Block 706 represents the computer 100 managing at least one task using the database schema within the computing system and computing system partitions with the redundancy group.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program utilizing (either partially or entirely) a database could benefit from the present invention.

A system in accordance with the present invention comprises at least one computing system partition, a plurality of computing systems, and at least one redundancy group. The computing system partitions include at least one instance of an application, at least one computing system node, and at least one copy of a database schema. The copies of the database schema are replicated at each computing system partition within a network. The computing system partition manages interactions between the instances, the computing system nodes, and the copy of the database schema within the respective computing system partition.

The computing systems are connected together via the network, and comprise one or more computing system partitions. The redundancy group comprises at least one computing system and at a plurality of computing system partitions, and manages the replication of the database schema within the computing system and computing system partitions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for use in providing reliable database access comprising:
   computing systems connected together through a network, each including at least one computing node;
   computing system partitions, each including at least one of the computing nodes and storing at least one copy of a database schema, where each database schema is stored in at least two of the computing system partitions;
   at least one redundancy group, each including at least two of the computing system partitions, where all of the computing system partitions in a redundancy group store copies of the same database schema, and where each redundancy group is configured to replicate that database schema across the computing system partitions in the redundancy group.

2. The system of claim 1, where the redundancy group is configured to select one of the computing nodes to send copies of the database schema to all computing system partitions in the redundancy group.

3. The system of claim 2, where the redundancy group is configured to select another computing node to send copies of the database schema to all computing system partitions in the redundancy group when the first selected computing node is unavailable.

4. The system of claim 1, where the redundancy group is reconfigured to include a computing system partition other than those originally included within the redundancy group.

5. The system of claim 1, where the redundancy group is reconfigured to include a computing node other than those originally included in the redundancy group.

6. The system of claim 1, where the redundancy group is reconfigured to exclude a computing system partition originally included in the redundancy group.

7. The system of claim 6, where another redundancy group is reconfigured to include the excluded computing system partition.

8. The system of claim 1, where the redundancy group is configured to monitor the status of each computing system partition in the group.

9. The system of claim 1, where the redundancy group is configured to reassign a task from one computing system partition to another when necessary.

10. A method for use in providing reliable database access comprising:
    connecting computing systems together through a network, where each computing system includes at least one computing;
    defining computing system partitions, where each includes at least one of the computing nodes, where each stores at least one copy of a database schema, and where each database schema is stored in at least two of the computing system partitions;
    defining at least one redundancy group, where each includes at least two of the computing system partitions and where all of the computing system partitions in a redundancy group store copies of the same database schema; and
    configuring each redundancy group to replicate that database schema across the computing system partitions in the redundancy group.

11. The method of claim 10, where the redundancy group is configured to select one of the computing nodes to send copies of the database schema to all computing system partitions in the redundancy group.

12. The method of claim 11, where the redundancy group is also configured to select another computing node to send copies of the database schema to all computing system partitions in the redundancy group when the first selected computing node is unavailable.

13. The method of claim 10, where the redundancy group is reconfigured to include a computing system partition other than those originally included within the redundancy group.

14. The method of claim 10, where the redundancy group is reconfigured to include a computing node other than those originally included in the redundancy group.

15. The method of claim 10, where the redundancy group is reconfigured to exclude a computing system partition originally included in the redundancy group.

16. The method of claim 15, where another redundancy group is reconfigured to include the excluded computing system partition.

17. The method of claim 10, where the redundancy group is configured to monitor the status of each computing system partition in the group.

18. The method of claim 10, where the redundancy group is configured to reassign a task from one computing system partition to another when necessary.

* * * * *